US008275224B2

(12) United States Patent
Doerr (10) Patent No.: US 8,275,224 B2
(45) Date of Patent: Sep. 25, 2012

(54) COHERENT RECEIVER HAVING AN INTERLEAVE-CHIRPED ARRAYED WAVEGUIDE GRATING

(75) Inventor: Christopher R. Doerr, Middletown, NJ (US)

(73) Assignee: Alcatel Lucent, Paris (FR)

(*) Notice: Subject to any disclaimer, the term of this patent is extended or adjusted under 35 U.S.C. 154(b) by 411 days.

(21) Appl. No.: 12/541,548

(22) Filed: Aug. 14, 2009

(65) Prior Publication Data

US 2011/0038631 A1  Feb. 17, 2011

(51) Int. Cl.
G02B 6/34 (2006.01)
G02B 6/26 (2006.01)
G02B 6/42 (2006.01)

(52) U.S. Cl. .................. 385/37; 385/1; 385/31; 385/32; 385/39; 385/46; 385/50

(58) Field of Classification Search ................ 385/1, 32, 385/37, 46
See application file for complete search history.

(56) References Cited

U.S. PATENT DOCUMENTS

| 5,909,522 | A | 6/1999 | Shirasaki et al. | |
|---|---|---|---|---|
| 6,049,640 | A | 4/2000 | Doerr | |
| 7,269,356 | B2 | 9/2007 | Winzer | |
| 7,724,991 | B1* | 5/2010 | Doerr | 385/14 |
| 2004/0033004 | A1* | 2/2004 | Welch et al. | 385/14 |
| 2007/0011036 | A1 | 1/2007 | Lo | |

FOREIGN PATENT DOCUMENTS

| EP | 0445943 A2 | 9/1991 |
|---|---|---|
| EP | 1130815 A2 | 9/2001 |
| WO | WO 2009071964 A1 | 6/2009 |

OTHER PUBLICATIONS

Doerr, C. R., et al., "Monolithic Silicon Coherent Receiver," Optical Society of America, (060.2330) Fiber optics communications; (130. 3120) Integrated optics devices, 2009, (3 pages).
Nagarajan, Radhakrishnan, et al., "Large-Scale Photonic Integrated Circuits," IEEE Journal of Selected Topics in Quantum Electronics, vol. 11, No. 1, Jan./Feb. 2005, pp. 50-65.
Doerr, C. R., "Proposed WDM Cross Connect Using a Planar Arrangement of Waveguide Grating Routers and Phase Shifters," IEEE Photonics Technology Letters, vol. 10, No. 4, Apr. 1998, pp. 528-530.
Zirngibl, M., "WDM receiver by monolithic integration of an optical preamplifier, waveguide grating router and photodiode array," Electronics Letters Mar. 30, 1995 vol. 31, No. 7, pp. 581-582.
International Search Report and Written Opinion received in PCT/US2010/044958 (filing date Aug. 10, 2010) mail date: Nov. 19, 2010.

* cited by examiner

*Primary Examiner* — Ryan Lepisto
(74) *Attorney, Agent, or Firm* — Mendelsohn, Drucker & Associates, P.C.; Steve Mendelsohn; Yuri Gruzdkov (57) ABSTRACT

An optical coherent detector that employs an interleave-chirped arrayed waveguide grating (AWG). The AWG has a periodic chirp pattern that enables the AWG to function as an optical 90-degree hybrid. If the AWG is implemented using a birefringent material, then the AWG can also function as a polarization demultiplexer. In one embodiment, the AWG is designed to simultaneously function as a wavelength demultiplexer, a polarization demultiplexer for each wavelength-division-multiplexed (WDM) signal component, and a 90-degree hybrid for each polarization-division-multiplexed component of each WDM signal component.

21 Claims, 5 Drawing Sheets

COHERENT RECEIVER HAVING AN INTERLEAVE-CHIRPED ARRAYED WAVEGUIDE GRATING

BACKGROUND

1. Field of the Invention

The present invention relates to optical communication equipment and, more specifically but not exclusively, to coherent optical receivers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

An optical coherent-detection scheme is capable of detecting not only the amplitude of an optical signal, but also the signal's phase. These capabilities make optical coherent detection compatible with the use of spectrally efficient modulation formats, such as quadrature-amplitude modulation and phase-shift keying (PSK) in its various forms (e.g., differential binary PSK and differential quadrature PSK). Compared to non-coherent detectors, optical coherent detectors offer relatively easy wavelength tunability, good rejection of interference from adjacent channels in wavelength-division-multiplexing (WDM) systems, linear transformation of the electromagnetic field into an electrical signal for effective application of modern digital-signal-processing techniques, and an opportunity to use polarization-division multiplexing (PDM).

An optical coherent detector usually employs a 90-degree hybrid that mixes a received optical communication signal and a local oscillator signal so that the data carried by the optical communication signal can be recovered. However, one problem with a prior-art optical coherent detector is that it typically requires a separate 90-degree hybrid for each WDM and/or PDM component of the optical communication signal. Disadvantageously, this multiplicity of constituent devices makes the use of optical coherent detection in WDM and/or PDM systems relatively expensive and causes the corresponding receivers to be relatively large and/or to exhibit relatively high optical attenuation.

SUMMARY

Disclosed herein are various embodiments of an optical coherent detector having an interleave-chirped arrayed waveguide grating (AWG). The AWG has a periodic chirp pattern that enables the AWG to function as an optical 90-degree hybrid. If the AWG is implemented using a birefringent material, then the AWG can also function as a polarization demultiplexer. In one embodiment, the AWG is designed to simultaneously function as a wavelength demultiplexer, a polarization demultiplexer for each wavelength-division-multiplexed (WDM) signal component, and a 90-degree hybrid for each polarization-division-multiplexed component of each WDM signal component. Advantageously over the prior art, optical coherent detectors of the invention can be implemented using relatively few constituent devices.

According to one embodiment, provided is an apparatus having an AWG that comprises (i) a substrate having a planar surface; (ii) a first optical star coupler being along said surface and having first and second optical inputs and a first spatial array of optical outputs; (iii) a second optical star coupler being along said surface and having a second spatial array of optical inputs and a third spatial array of optical outputs; and (iv) an array of waveguide arms, each waveguide arm connecting one optical output of the first spatial array to a corresponding optical input of the second spatial array. The array of waveguide arms is configured to cause a first set of four optical outputs of the third spatial array to receive four different phase combinations of light received at the first and second optical inputs in response to the light received at the first and second optical inputs being of about the same wavelength.

According to another embodiment, provided is a method of processing an optical signal having the step of providing an AWG that comprises (i) a substrate having a planar surface; (ii) a first optical star coupler being along said surface and having first and second optical inputs and a first spatial array of optical outputs; (iii) a second optical star coupler being along said surface and having a second spatial array of optical inputs and a third spatial array of optical outputs; and (iv) an array of waveguide arms, each waveguide arm connecting one optical output of the first spatial array to a corresponding optical input of the second spatial array. The method further has the step of applying (a) an optical input signal to a first optical input waveguide and (b) a local-oscillator signal to a second optical input waveguide of the AWG to produce four different phase combinations of the optical input signal and the local-oscillator signal at a set of four optical outputs of the third spatial array.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
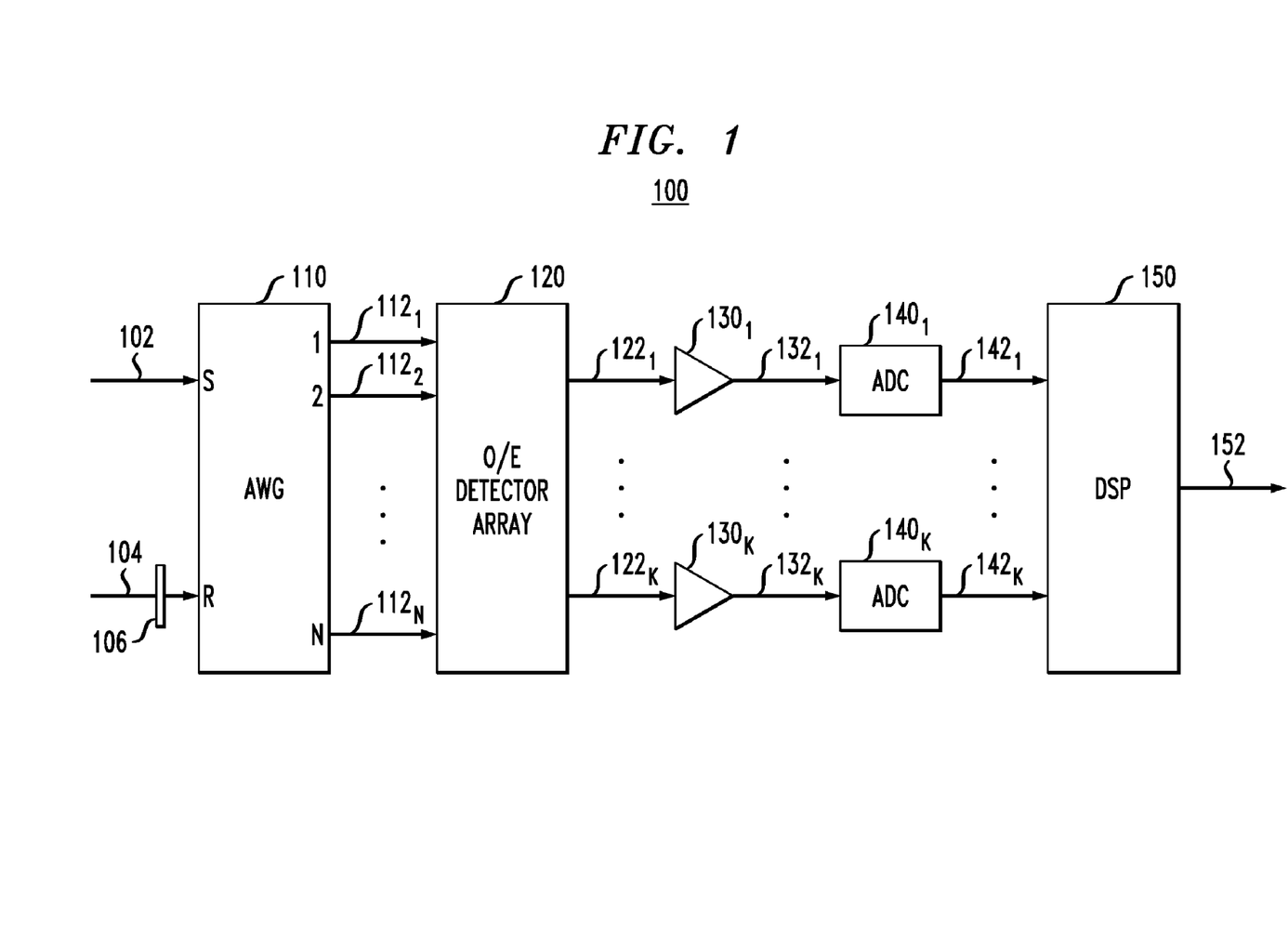
FIG. 1 shows a block-diagram of a coherent optical receiver according to one embodiment of the invention.

FIG. 1 shows a block-diagram of a coherent optical receiver 100 according to one embodiment of the invention. Receiver 100 has an arrayed waveguide grating (AWG) 110 having (i) two input ports labeled S and R and (ii) a plurality of output ports labeled 1 through N. AWG 110 optically mixes input signals 102 and 104 applied to input ports S and R, respectively, to generate N mixed signals $112_1$-$112_N$ at output ports 1 through N, respectively. In various embodiments, input signal 102 can be a non-multiplexed signal or a multiplexed signal that has wavelength-division-multiplexed (WDM) and/or polarization-division multiplexed (PDM) signal components. Depending on the intended type of input signal 102, AWG 110 can be designed to perform the functions of: (i) a 90-degree hybrid; (ii) a wavelength demultiplexer and a 90-degree hybrid for each WDM component; (iii) a polarization demultiplexer and a 90-degree hybrid for each PDM component; or (iv) a wavelength demultiplexer, a polarization demultiplexer for each WDM component, and a 90-degree hybrid for each PDM component of each WDM component. Representative AWG structures corresponding to these embodiments of AWG 110 are described in more detail below in reference to FIGS. 2-5.

Input signal 104 is a local-oscillator (LO) signal that is used for coherent detection of input signal 102. As such, input signal 104 has signal components corresponding to the signal components of input signal 102. For example, if input signal 102 has n WDM components, then LO signal 104 also has n spectral components, each having substantially the same optical-carrier frequency (wavelength) as the corresponding WDM component of input signal 102. Similarly, if input signal 102 has two PDM components for each optical-carrier frequency, then LO signal 104 also has two corresponding polarization components for each optical-carrier frequency. In one embodiment, LO signal 104 is generated at receiver 100, as known in the art, e.g., using an optical phase-lock loop (PLL, not explicitly shown in FIG. 1). In an alternative embodiment, LO signal 104 is received from a remote transmitter (not explicitly shown in FIG. 1), e.g., as disclosed in U.S. Pat. No. 7,269,356, which is incorporated herein by reference in its entirety.

Note that the embodiments of receiver 100 designed for processing PDM signals might include an optional polarization-control element 106 located at input port R of AWG 110. One function of polarization-control element 106 is to ensure that LO signal 104 provides adequate optical power for each of the relevant signal polarizations. For example, polarization-control element 106 might be configured to change/rotate the polarization of LO signal 104 so that, upon coupling into AWG 110, the LO signal has substantially equal optical power in transverse electric (TE) and transverse magnetic (TM) waveguide-polarization modes. Equal power partition will occur, e.g., when polarization-control element 106 causes (i) the polarization of a linearly polarized LO signal 104 to be oriented at about 45 degrees with respect to the plane of AWG 110 or (ii) LO signal 104 to be circularly polarized.

As used in this specification, the terms TE and TM polarizations/modes are inclusive of both (i) conventional TE and TM polarizations/modes and (ii) quasi-TE and quasi-TM polarizations/modes.

Receiver 100 further has a detector array 120 that converts N optical signals $112_1$-$112_N$ into K electrical signals $122_1$-$122_K$ indicative of complex values corresponding to the independently modulated components of input signal 102. Each of electrical signals $122_1$-$122_K$ might be amplified in a corresponding (optional) amplifier 130. Each of the resulting signals $132_1$-$132_K$ is converted into digital form in a corresponding analog-to-digital converter (ADC) 140. The resulting digital signals $142_1$-$142_K$ are processed by a digital signal processor (DSP) 150 to recover the data carried by each independently modulated component of input signal 102. In a representative embodiment, N=K or N=2K. In one embodiment, AWG 110 and detector array 120 are implemented on a common substrate as parts of a single integrated circuit.

Figure 2:
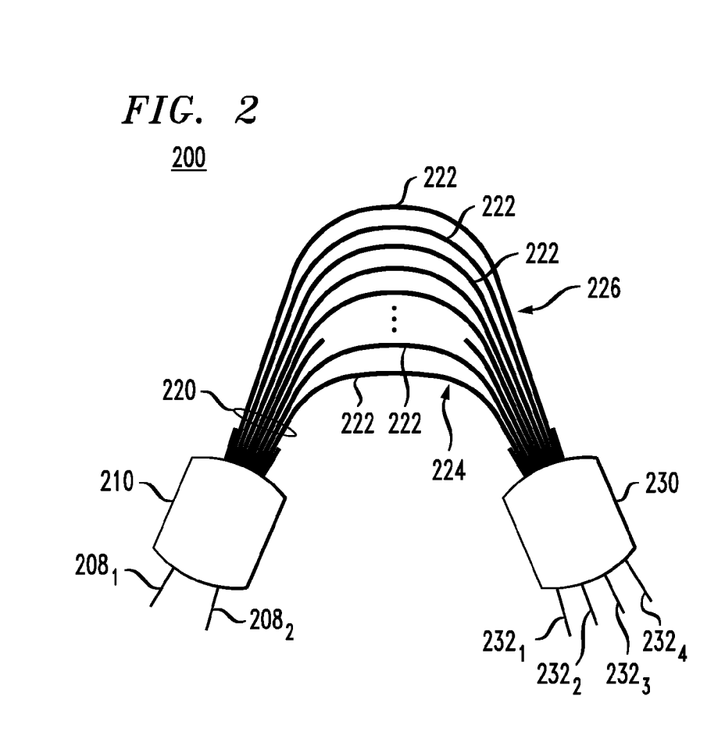
FIG. 2 schematically shows the layout of an arrayed waveguide grating (AWG) that can be used in the receiver of FIG. 1 according to one embodiment of the invention.

FIG. 2 schematically shows the layout of an AWG 200 that can be used as AWG 110 (FIG. 1) according to one embodiment of the invention. More specifically, AWG 200 corresponds to N=4 (see FIG. 1) and is designed to function as an optical 90-degree hybrid. AWG 200 has waveguide couplers (also sometimes referred to as star couplers) 210 and 230 connected by a plurality 220 of AWG waveguide arms 222. If AWG 200 is used as AWG 110 (FIG. 1), then input ports $208_1$ and $208_2$ of coupler 210 serve as input ports S and R, respectively, of receiver 100. Output ports $232_1$-$232_4$ of coupler 230 correspond to output ports 1-4 of AWG 110.

In a non-chirped AWG, the difference in length between any two adjacent AWG arms (analogous to AWG arms 222 of AWG 200) is a constant (hereafter designated ΔL). Mathematically, this property of a non-chirped AWG can be expressed using Eq. (1):

$$L_m = L_0 + m\Delta L \quad (1)$$

where m is an index identifying the m-th waveguide arm of the lateral spatial sequence of said arms on the planar substrate. Here, m=0 corresponds to the first or shortest AWG arm, which has a length $L_0$; and $L_m$ is the length of the m-th AWG arm of the lateral spatial sequence. In contrast, in an interleave-chirped AWG, the difference in length between adjacent AWG arms can be modulated, e.g., in a periodic manner, and depends on index m. Mathematically, this property of an interleave-chirped AWG can be approximately expressed using Eq. (2):

$$L_m = L_0 + m\Delta L + l(m \bmod M) \quad (2)$$

where M is the period of the chirp pattern, and l(m mod M) is a discrete arm-length-modulation function that depends on the remainder on division of index m by period M. Some chirped AWGs and some non-chirped AWGs can be implemented with ΔL=0. Additional details on the design and implementation of interleave-chirped AWGs can be found, e.g., in commonly owned U.S. Pat. Nos. 5,909,522 and 6,049,640, both of which are incorporated herein by reference in their entirety.

In one embodiment, AWG 200 is an interleave-chirped AWG, in which AWG arms 222 have a chirp pattern described by an arm-length-modulation function l(m mod M) selected from, e.g., the set of eight representative discrete functions $l_1(i)$-$l_8(i)$ listed in Table 1. Note that the discrete functions listed in Table 1 correspond to a period of M=4 AWG arms. Each of the listed discrete functions is normalized, with the wavelength of interest ($\lambda_c$) serving as the normalization factor. In various embodiments, $\lambda_c$ can be a carrier wavelength of the input signal or an average wavelength for the plurality of WDM components to be present in the input signal.

TABLE 1

Representative AWG Chirp Patterns

| | i = 0 | i = 1 | i = 2 | i = 3 |
|---|---|---|---|---|
| $l_1(i)/\lambda_c$ | 3/8 | 0 | −1/8 | 0 |
| $l_2(i)/\lambda_c$ | 0 | −1/8 | 0 | 3/8 |
| $l_3(i)/\lambda_c$ | −1/8 | 0 | 3/8 | 0 |
| $l_4(i)/\lambda_c$ | 0 | 3/8 | 0 | −1/8 |
| $l_5(i)/\lambda_c$ | −3/8 | 0 | 1/8 | 0 |
| $l_6(i)/\lambda_c$ | 0 | 1/8 | 0 | −3/8 |
| $l_7(i)/\lambda_c$ | 1/8 | 0 | −3/8 | 0 |
| $l_8(i)/\lambda_c$ | 0 | −3/8 | 0 | 1/8 |

One skilled in the art will appreciate that other suitable chirp patterns can similarly be used in AWG 200. In various embodiments, waveguide plurality 220 can have different numbers of AWG arms 222, with the minimum number of arms being four. There is no theoretical limit on the maximum number of AWG arms 222, i.e., the number can be any number greater than four. However, practical considerations, e.g., of construction, might nevertheless limit said maximum number.

When AWG 200 is implemented using arm-length modulation function $l_1(i)$, with input ports $208_1$ and $208_2$ being spaced by a quarter diffraction zone and output ports $232_1$-$232_4$ being correspondingly spaced, the chirp pattern of AWG arms 222 causes the AWG to produce four output signals of substantially equal intensity at the output ports. Eq. (3) approximately gives the relationship between the electric fields $E_p$ at output ports $232_1$-$232_4$ of AWG 200 (where the subscript p=1 . . . 4 denotes the output-port number):

$$\begin{bmatrix} E_1 \\ E_2 \\ E_3 \\ E_4 \end{bmatrix} = \frac{1}{2} \begin{bmatrix} E_S - E_R \\ -E_S + jE_R \\ -jE_S - jE_R \\ -jE_S + E_R \end{bmatrix} \quad (3)$$

where $E_S$ and $E_R$ are the electric fields of the optical signals applied to input ports $208_1$ and $208_2$, respectively. One skilled in the art will recognize that Eq. (3) corresponds to the functionality of a conventional optical 90-degree hybrid, meaning that an embodiment of AWG 200 can be used to implement that functionality in a coherent receiver, such as receiver 100 (FIG. 1). One skilled in the art will further recognize that the use of the other arm-length-modulation functions listed in Table 1 will result in the relationships between the electric fields $E_p$ at output ports $232_1$-$232_4$ of AWG 200 that are analogous to the relationship given by Eq. (3).

AWG arms 222 are typically arranged on a plane in a non-intersecting manner to form a planar array of waveguides, the planar array having a first side edge 224 and a second side edge 226. In one embodiment corresponding to a non-zero value of ΔL, the lengths of AWG arms 222 in the planar array monotonically increase with a change of the lateral position on the plane, in accordance with Eq. (2), so that the AWG arm located at side edge 224 has the smallest length and the AWG arm located at side edge 226 has the largest length. In an alternative embodiment corresponding to ΔL=0, if the chirp pattern defined by the arm-length-modulation function l(m mod M) is disregarded, then all AWG arms 222 have the same length.

Figure 3:
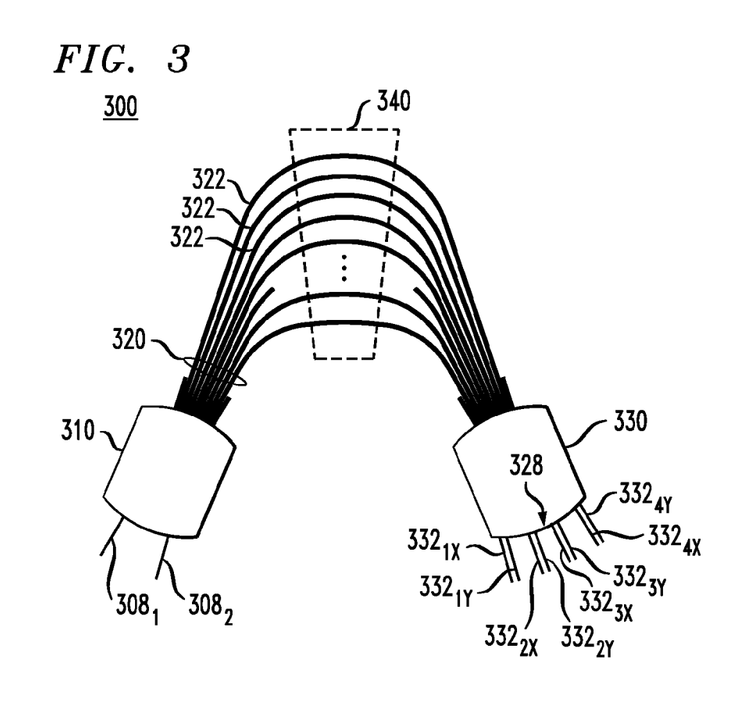
FIG. 3 schematically shows the layout of an AWG that can be used in the receiver of FIG. 1 according to another embodiment of the invention.

FIG. 3 schematically shows the layout of an AWG 300 that can be used as AWG 110 (FIG. 1) according to another embodiment of the invention. AWG 300 is generally analogous to AWG 200 (FIG. 2), with analogous elements of the two AWGs designated with labels having the same last two digits. However, in contrast with AWG 200, AWG 300 corresponds to N=8 (also see FIG. 1) and is designed to simultaneously function as a polarization demultiplexer and a 90-degree hybrid for each PDM component. In various embodiments, waveguide plurality 320 can have different numbers of AWG arms 322, with the minimum number of arms being eight.

The polarization demultiplexer functionality of AWG 300 is enabled by the presence of a birefringence zone 340. For example, for each AWG arm 322, a portion of the arm within zone 340 might be made of a waveguide material characterized by relatively high birefringence. Another suitable arrangement for implementing AWG arms 322 within zone 340 might include a waveguide core with a large aspect ratio, such as an InP deeply etched ridge with a thin InGaAsP guiding layer. Birefringence zone 340 might include the entire waveguide plurality 320 or only a portion of it. The waveguides in zone 340 might or might not use birefringent materials. In addition to the above-mentioned materials, other suitable materials for implementing the waveguides in zone 340 might be Si, InGaAs, SiO$_2$, and SiON.

Exemplary designs and methods of fabrication of birefringent segments of planar optical waveguides are described, e.g., in U.S. patent application Ser. No. 12/194,352, filed on Aug. 19, 2008, which is incorporated herein by reference in its entirety. These designs and methods may be useful for implementing the portions of AWG waveguide arms 322 in zone 340.

Birefringence zone 340 causes each of the output signals corresponding to Eq. (3) to split into two spatially separated components corresponding to the TE and TM polarization modes, respectively. The magnitude of the polarization-dependent wavelength split (PDWS) is determined by the difference between the effective refraction indices for the TE and TM modes within waveguide plurality 320 in general and in zone 340 in particular. Hence, the materials for implementing birefringence zone 340 are selected so that the PDWS is sufficiently large to enable side-by-side placement of eight output waveguides 332 at an output facet 328 of waveguide coupler 330. Eqs. (4a-4b) approximately give the relationship between the electric fields $E_{pX}$ and $E_{pY}$ at output ports $332_{1X}$-$332_{4X}$ and $332_{1Y}$-$332_{4Y}$, respectively, of AWG 300:

$$\begin{bmatrix} E_{1X} \\ E_{2X} \\ E_{3X} \\ E_{4X} \end{bmatrix} = \frac{1}{2} \begin{bmatrix} E_{SX} - E_{RX} \\ -E_{SX} + jE_{RX} \\ -jE_{SX} - jE_{RX} \\ -jE_{SX} + E_{RX} \end{bmatrix} \quad (4a)$$

$$\begin{bmatrix} E_{1Y} \\ E_{2Y} \\ E_{3Y} \\ E_{4Y} \end{bmatrix} = \frac{1}{2} \begin{bmatrix} E_{SY} - E_{RY} \\ -E_{SY} + jE_{RY} \\ -jE_{SY} - jE_{RY} \\ -jE_{SY} + E_{RY} \end{bmatrix} \quad (4b)$$

where $E_{SX}$ and $E_{SY}$ are the electric fields corresponding to the TE and TM polarizations, respectively, of the optical signal applied to input port $308_1$ of AWG 300 (e.g., optical communication signal 102 of FIG. 1); and $E_{RX}$ and $E_{RY}$ are the electric fields corresponding to the TE and TM polarizations, respectively, of the optical signal applied to input port $308_2$ of the AWG (e.g., LO signal 104 of FIG. 1). Eqs. (4a-4b) demonstrate that AWG 300 simultaneously serves as a polarization demultiplexer for the TE and TM polarizations and an optical 90-degree hybrid for each of the polarizations for two reasons. First, the different optical output ports of the first set of optical output ports $332_{1X}$-$332_{4X}$ and of the second set of optical output ports $332_{1Y}$-$332_{4Y}$ output combinations of signal and local oscillator light with different relative phase combinations, i.e., as in optical 90-degree hybrids. Second, the first set of optical output ports $332_{1X}$-$332_{4X}$ output such combinations for one polarization component, and the second set of optical output ports $332_{1Y}$-$332_{4Y}$ output such combinations for the other, relatively orthogonal polarization component, i.e., as in a polarization demultiplexer.

Figure 4:
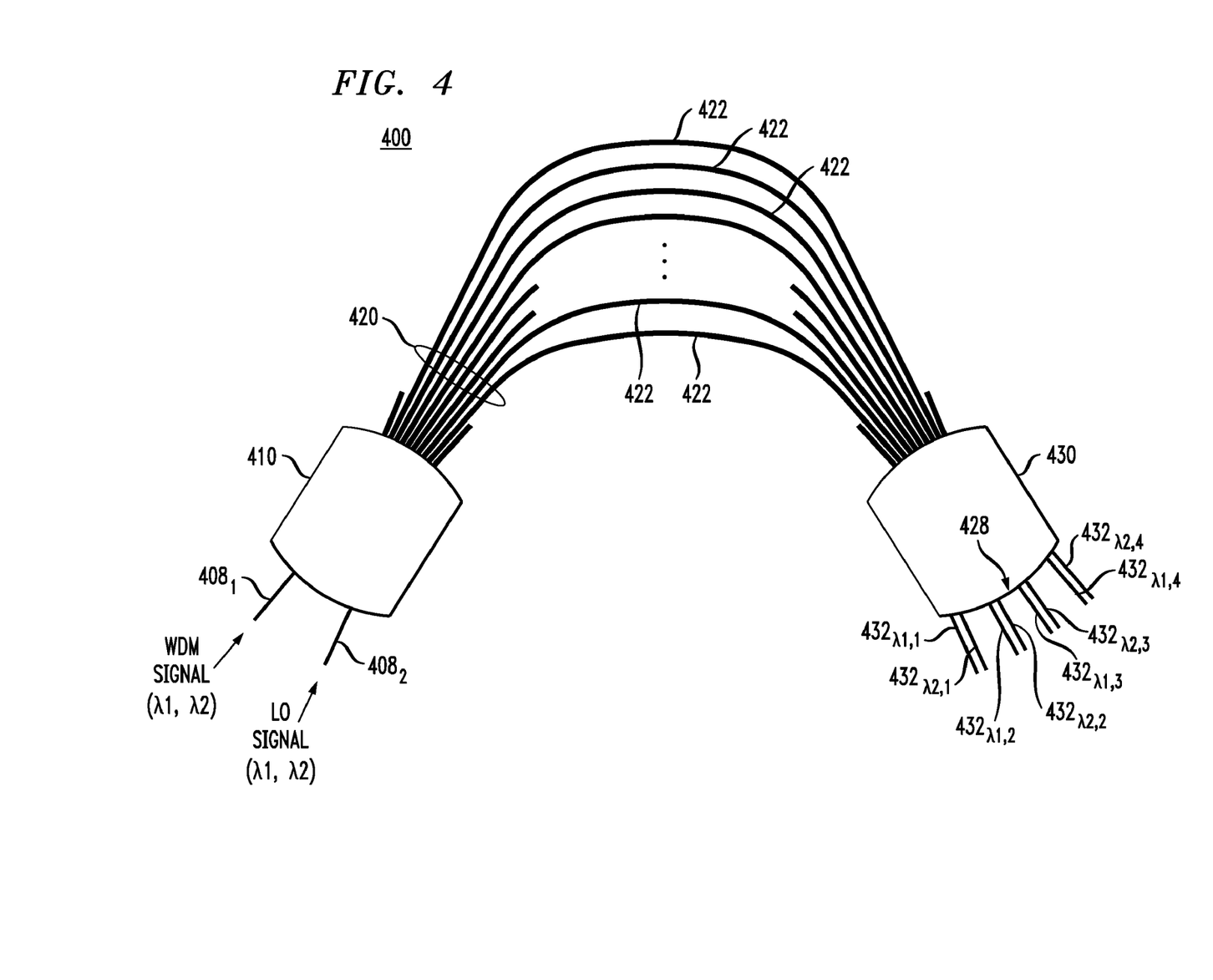
FIG. 4 schematically shows the layout of an AWG that can be used in the receiver of FIG. 1 according to yet another embodiment of the invention.

FIG. 4 schematically shows the layout of an AWG 400 that can be used as AWG 110 (FIG. 1) according to yet another embodiment of the invention. AWG 400 is generally analogous to AWG 200 (FIG. 2), with analogous elements of the two AWGs designated with labels having the same last two digits. However, in contrast with AWG 200, AWG 400 corresponds to N=8 (also see FIG. 1) and is designed to simultaneously function as a two-channel wavelength demultiplexer and a 90-degree hybrid for each of the WDM components (having carrier wavelengths λ1 and λ2, respectively). One skilled in the art will understand that the design of AWG 400 can be generalized for any desired integer number n (>2) of WDM channels, which generalization will result in the number of output waveguides 432 being N=4n. In various embodiments, waveguide plurality 420 can have different numbers of AWG arms 422, with the minimum possible number of arms being 4n.

AWGs that can serve as wavelength demultiplexers are known in the art. A detailed description of the wavelength-demultiplexer functionality of AWG 400 is not given here because it is generally similar to that of certain prior-art AWGs. For additional details, the reader is referred to, e.g., the above-cited U.S. Pat. Nos. 5,909,522 and 6,049,640, where a suitable description can be found.

The added 90-degree-hybrid functionality of AWG 400 is similar to that of AWG 200 and is enabled by the chirp pattern (e.g., defined by one of the discrete functions listed in Table 1) of AWG arms 422. In effect, the chirp pattern causes each de-multiplexed WDM signal produced in accordance with the wavelength-demultiplexer functionality of AWG 400 to split four ways in accordance with Eq. (3). To capture and direct the mixed signals corresponding to the split WDM components for further processing, e.g., in detector array 120 (FIG. 1), AWG 400 has eight output waveguides $432_{\lambda 1,1}$-$432_{\lambda 1,4}$ and $432_{\lambda 2,1}$-$432_{\lambda 2,4}$ that are appropriately positioned at an output facet 428 of waveguide coupler 430.

Figure 5A:
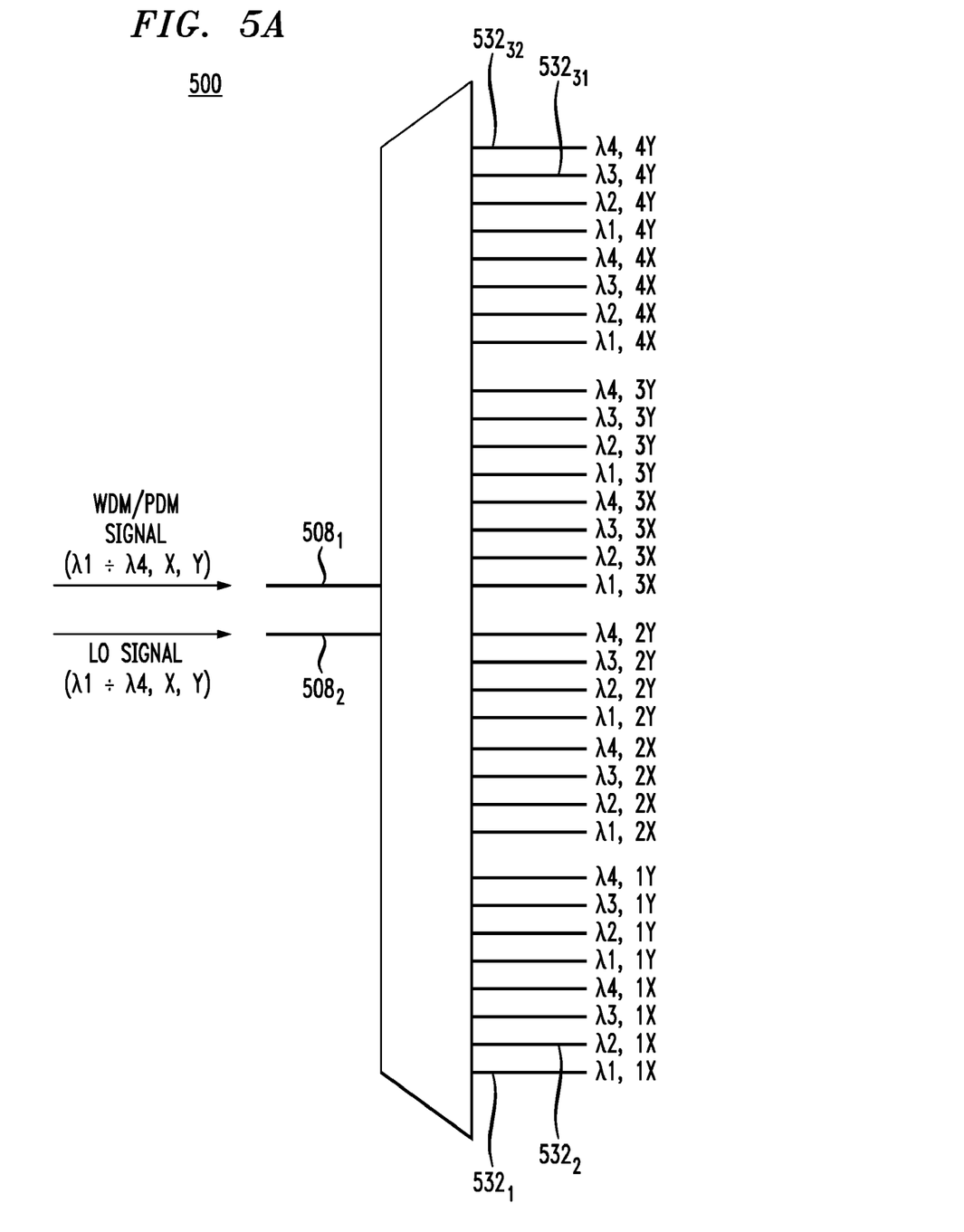
FIGS. 5A-B show diagrams of an AWG that can be used in the receiver of FIG. 1 according to yet another embodiment of the invention.
Figure 5B:
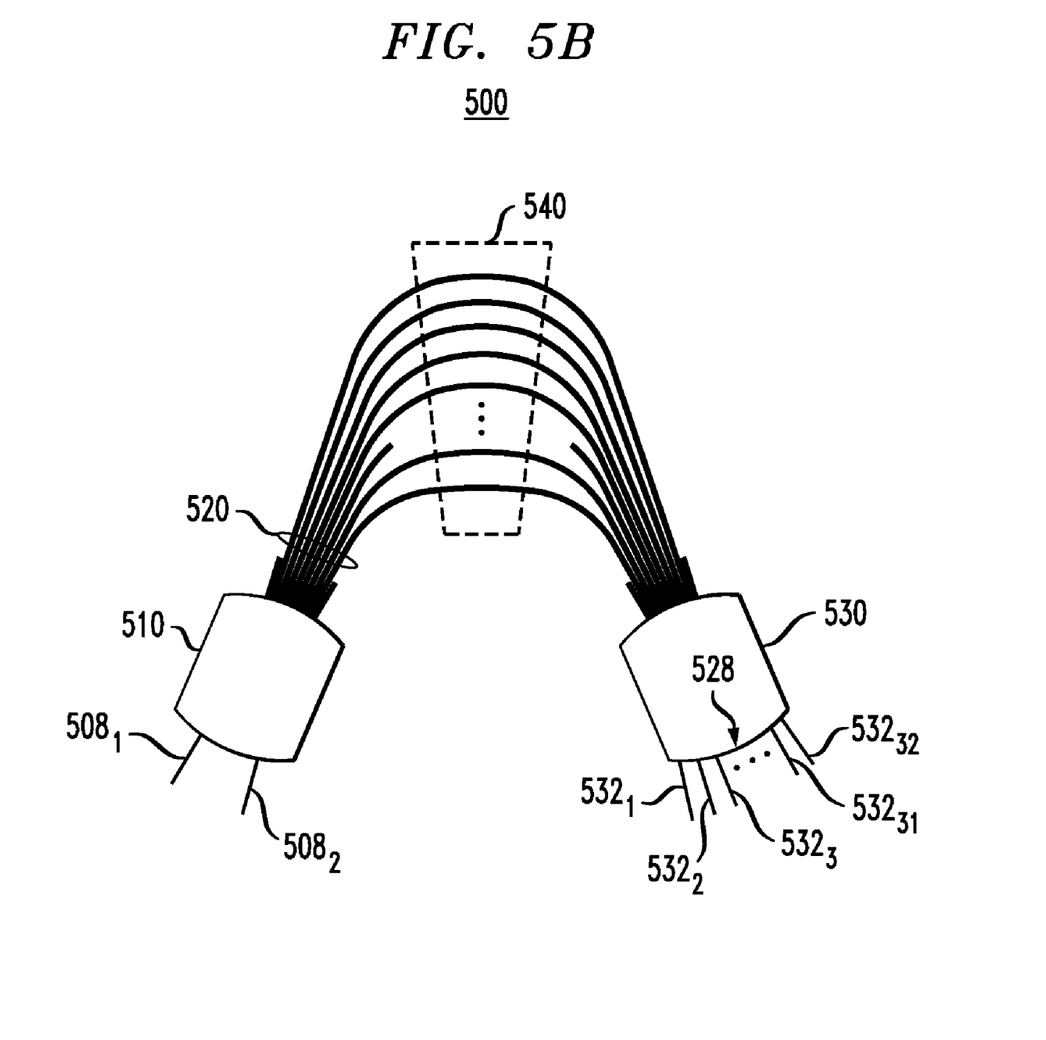

FIGS. 5A-B show diagrams of an AWG 500 that can be used as AWG 110 (FIG. 1) according to yet another embodiment of the invention. More specifically, FIG. 5A shows a block diagram of AWG 500. FIG. 5B schematically shows the layout of AWG 500. AWG 500 is generally analogous to AWG 300 (FIG. 3), with analogous elements of the two AWGs designated with labels having the same last two digits. However, in contrast with AWG 300, AWG 500 corresponds to N=32 (also see FIG. 1) and is designed to simultaneously function as a four-channel wavelength demultiplexer, a polarization demultiplexer for each of the four WDM channels, and a 90-degree hybrid for each of two orthogonal polarizations of each of the four WDM channels. Illustratively, the four WDM channels are shown as having carrier wavelengths $\lambda 1$-$\lambda 4$, where $\lambda 1 < \lambda 2 < \lambda 3 < \lambda 4$.

The polarization-demultiplexer functionality of AWG 500 is enabled by a birefringence zone 540. The 90-degree-hybrid functionality of AWG 500 is enabled by a chirp pattern (e.g., defined by one of the discrete functions listed in Table 1) of AWG arms 522. In effect, birefringence zone 540 and the chirp pattern of AWG arms 522 cause each de-multiplexed WDM channel signal S produced in accordance with the conventional wavelength-demultiplexer functionality of AWG 500 to be directed to a set of eight output ports $532_{S1}$, $532_{S2}, \ldots, 532_{S8}$. That is, a set of eight output ports of AWG 500 output eight different relative phase and polarization combinations of signal light and local oscillator light for each input WDM wavelength channel in accordance with Eqs. (4a-4b). To capture and direct the mixed signals corresponding to the split WDM/PDM components for further processing, e.g., in detector array 120 (FIG. 1), AWG 500 has thirty two (32) output waveguides 532 that are appropriately positioned at an output facet 528 of waveguide coupler 530.

The block diagram of FIG. 5A shows the relative spatial arrangement of different output waveguides 532 corresponding to different WDM/PDM components of the input signal applied to input port $508_1$ (e.g., optical communication signal 102 of FIG. 1). More specifically, the following nomenclature is used in FIG. 5A to label the various mixed signals produced in output waveguides 532: (1) $\lambda i$ indicates the wavelength, where i=1, 2, 3, 4; (2) 1X, 2X, 3X, and 4X indicate the TE-polarized mixed signals corresponding to the four rows of Eq. (4a); and (3) 1Y, 2Y, 3Y, and 4Y indicate the TM-polarized mixed signals corresponding to the four rows of Eq. (4b).

One skilled in the art will understand that the design of AWG 500 can be generalized for any desired number n (where $2 \leq n \leq n_{max}$) of WDM channels, which generalization will result in the number of output waveguides 532 being N=8n. The maximum number of WDM channels ($n_{max}$) that can be accommodated in such a design is determined by the polarization-dependent wavelength split (PDWS) in the AWG and is given by Eq. (5):

$$n_{max} \leq \frac{PDWS}{\Delta \lambda} \quad (5)$$

where $\Delta\lambda$ is the channel spacing. The PDWS is expressed by Eq. (6) as follows:

$$PDWS = 2\lambda_c \frac{n_{TE} - n_{TM}}{n_{TE} + n_{TM}} \quad (6)$$

where $\lambda_c$ is the average wavelength for the WDM channels of the AWG; $n_{TE}$ is the effective refractive index for the TE polarization mode at wavelength $\lambda_c$; and $n_{TM}$ is the effective refractive index for the TM polarization mode at wavelength $\lambda_c$. In various embodiments, waveguide plurality 520 can have different numbers of AWG waveguide arms 522, with the minimum number of arms being 8n. In one embodiment, AWG 500 has one hundred AWG waveguide arms 522, is designed to operate in the 21$^{st}$ grating order, and has channel spacing $\Delta\lambda$ of about 200 GHz.

One advantage of various embodiments of the invention is that the 90-degree-phase characteristic of the hybrid can be highly accurate even when the device is implemented using the photonic-integrated-circuit (PIC) technology. For comparison, in prior-art 90-degree hybrids implemented using the PIC technology, the phase differences for the various outputs of the 90-degree hybrid can significantly deviate from 90 degrees because they are typically determined by a single element, e.g., a multi-mode-interference coupler, used in the hybrid. Thus, even a relatively small error or inaccuracy (e.g., in the dimensions during the fabrication process) of that single element can lead to a significant deviation of the phase differences from the requisite 90 degrees. In contrast, in various embodiments of the present invention, a small error in the length of one particular AWG arm does not have a profound effect on the phase because that error is mitigated by the effective averaging over many AWG arms.

While this invention has been described with reference to illustrative embodiments, this description is not intended to be construed in a limiting sense. Although embodiments of the invention have been described in reference to TE and TM polarization modes, various embodiments of the invention can also be used to process any suitable polarization-multiplexed signals, e.g., those using (i) left and right circular polarizations and (ii) mutually orthogonal linear polarizations. Various modifications of the described embodiments, as well as other embodiments of the invention, which are apparent to persons skilled in the art to which the invention pertains are deemed to lie within the principle and scope of the invention as expressed in the following claims.

As used herein, the term "optical hybrid" refers to an optical mixer designed to mix an optical input signal having a carrier frequency and a local-oscillator signal having the same carrier frequency to generate a plurality of mixed signals corresponding to different relative phase shifts between the input signal and the LO signal. An optical 90-degree hybrid is a particular type of an optical hybrid that is designed to produce at least four mixed signals corresponding to the relative phase shifts between the input signal and the LO signal of approximately 0, 90, 180, and 270 degrees, respectively. One skilled in the art will understand that each of the phase shifts is defined without accounting for a possible additional phase shift that is an integer multiple of 360 degrees.

The present invention may be implemented using free space optics and/or waveguide circuits, including possible implementation on a single integrated circuit or package.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An apparatus, comprising an arrayed waveguide grating (AWG) that comprises:
a substrate having a planar surface;
a first optical star coupler being along said surface and having first and second optical inputs and a first spatial array of optical outputs;
a second optical star coupler being along said surface and having a second spatial array of optical inputs and a third spatial array of optical outputs; and
an array of waveguide arms, each waveguide arm connecting one optical output of the first spatial array to a corresponding optical input of the second spatial array, wherein the array of waveguide arms is configured to cause a first set of four optical outputs of the third spatial array to receive four different phase combinations of light received at the first and second optical inputs in response to the light received at the first and second optical inputs being of about the same wavelength, wherein the four different phase combinations are combinations of the light from the first and second optical input ports with relative phases of about 0, π/2 radians, π radians, and 3π/2 radians.

2. The apparatus of claim 1, the array of waveguide arms is configured to cause a separate second set of four optical outputs of the third array to receive four second combinations of the light, the second combinations being a polarization of component of the light that is about orthogonal to a polarization of the light output to the first set of optical outputs of the third array.

3. The apparatus of claim 2 wherein the four second combinations are combinations of the light from the first and second optical input ports with relative phases of about 0, π/2 radians, π radians, and 3π/2 radians.

4. The apparatus of claim 1, the array of waveguide arms is configured to cause a separate second set of four optical outputs of the third array to receive four second combinations of the light, the second combinations having a wavelength that is different than a wavelength of the light output to the first set of optical outputs of the third array.

5. The apparatus of claim 1, wherein, for at least some of the waveguide arms, at least a portion of the arm comprises a birefringent waveguide.

6. The apparatus of claim 5, further comprising a polarization-control element configured to change a polarization of the light received at the second optical input so that optical power is partitioned between a first polarization and a second polarization approximately orthogonal to the first polarization.

7. The apparatus of claim 6, wherein:
the first polarization is a transverse electric (TE) waveguide mode; and
the second polarization is a transverse magnetic (TM) waveguide mode.

8. The apparatus of claim 6, wherein the polarization-control element is configured to partition the optical power substantially equally between the first and second polarizations.

9. The apparatus of claim 1, wherein:
the AWG is adapted to function as an n-channel wavelength demultiplexer, where n is a positive integer greater than one; and
the third spatial array of optical outputs comprises 4n optical outputs, each for receiving a corresponding mixed signal that differs from each of the remaining (4n−1) mixed signals in at least one of (i) a carrier wavelength and (ii) a value of relative phase shift between the light applied to the first and second optical inputs.

10. The apparatus of claim 1, wherein the array of waveguide arms has a periodic chirp pattern with a period of four waveguide arms.

11. The apparatus of claim 10, wherein the chirp pattern consists of:
(i) two zeros, $$-\frac{\lambda_c}{8}, \text{ and } \frac{3\lambda_c}{8};$$

or
(ii) two zeros, $$-\frac{3\lambda_c}{8}, \text{ and } \frac{\lambda_c}{8},$$

arranged in a selected order, where $\lambda_c$ is a wavelength corresponding to one or more wavelength channels of the AWG.

12. The apparatus of claim 1, further comprising an array of photo-detectors, each optically coupled to a corresponding output of the third spatial array of optical outputs, wherein the substrate is a common substrate for the AWG and the array of photo-detectors.

13. The apparatus of claim 1, wherein:
the waveguide arms are arranged on a plane in a non-intersecting manner for the array of waveguide arms to have a first side edge and a second side edge; and
the waveguide arms have lengths that monotonically change from one waveguide arm to a next waveguide arm so that the waveguide arm located at the first side edge has a smallest length and the waveguide arm located at the second side edge has a largest length.

14. The apparatus of claim 1, wherein the apparatus is an optical receiver further comprising:
an array of photo-detectors, each optically coupled to a corresponding output of the third spatial array of optical outputs and adapted to convert a corresponding optical output signal into an electrical signal;
an analog-to-digital converter adapted to convert the electrical signals produced by the array of photo-detectors into corresponding digital signals; and
a digital signal processor that receives the digital signals, wherein:
an optical input signal applied to the first optical input comprises a plurality of independently modulated components; and the digital signal processor is adapted to process the digital signals to recover data carried by each of said independently modulated components.

15. The apparatus of claim 14, wherein the plurality of independently modulated components comprises two or more WDM components.

16. The apparatus of claim 15, wherein the plurality of independently modulated components also comprises two or more PDM components.

17. The apparatus of claim 14 wherein the plurality of independently modulated components comprises two or more PDM components.

18. A method of processing an optical signal, comprising:
(a) providing an arrayed waveguide grating (AWG) comprising:
  a substrate having a planar surface;
  a first optical star coupler being along said surface and having first and second optical inputs and a first spatial array of optical outputs;
  a second optical star coupler being along said surface and having a second spatial array of optical inputs and a third spatial array of optical outputs; and
  an array of waveguide arms, each waveguide arm connecting one optical output of the first spatial array to a corresponding optical input of the second spatial array; and
(b) applying (i) an optical input signal to a first optical input waveguide and (ii) a local-oscillator signal to a second optical input waveguide of the AWG to produce four different phase combinations of the optical input signal and the local-oscillator signal at a set of four optical outputs of the third spatial array.

19. The method of claim 18, further comprising demultiplexing the optical input signal using the AWG, wherein:
the optical input signal has n carrier wavelengths, where n is a positive integer; and
the third spatial array of optical outputs comprises 8n outputs, each receiving a corresponding output signal that differs from each of the other (8n−1) output signals in at least one of (i) a carrier wavelength, (ii) polarization, and (iii) a value of relative phase shift between the optical input signal and the local-oscillator signal.

20. An apparatus, comprising an arrayed waveguide grating (AWG) that comprises:
a substrate having a planar surface;
a first optical star coupler being along said surface and having first and second optical inputs and a first spatial array of optical outputs;
a second optical star coupler being along said surface and having a second spatial array of optical inputs and a third spatial array of optical outputs; and
an array of waveguide arms, each waveguide arm connecting one optical output of the first spatial array to a corresponding optical input of the second spatial array, wherein the array of waveguide arms is configured to cause a first set of four optical outputs of the third spatial array to receive four different phase combinations of light received at the first and second optical inputs in response to the light received at the first and second optical inputs being of about the same wavelength, wherein:
  the AWG is adapted to function as an n-channel wavelength demultiplexer, where n is a positive integer greater than one; and
  the third spatial array of optical outputs comprises 4n optical outputs, each for receiving a corresponding mixed signal that differs from each of the remaining (4n−1) mixed signals in at least one of (i) a carrier wavelength and (ii) a value of relative phase shift between the light applied to the first and second optical inputs.

21. An apparatus, comprising an arrayed waveguide grating (AWG) that comprises:
a substrate having a planar surface;
a first optical star coupler being along said surface and having first and second optical inputs and a first spatial array of optical outputs;
a second optical star coupler being along said surface and having a second spatial array of optical inputs and a third spatial array of optical outputs; and
an array of waveguide arms, each waveguide arm connecting one optical output of the first spatial array to a corresponding optical input of the second spatial array, wherein the array of waveguide arms is configured to cause a first set of four optical outputs of the third spatial array to receive four different phase combinations of light received at the first and second optical inputs in response to the light received at the first and second optical inputs being of about the same wavelength, wherein the array of waveguide arms has a periodic chirp pattern with a period of four waveguide arms, wherein the chirp pattern consists of:
(i) two zeros, $$-\frac{\lambda_c}{8}, \text{ and } \frac{3\lambda_c}{8};$$

or
(ii) two zeros, $$-\frac{3\lambda_c}{8}, \text{ and } \frac{\lambda_c}{8},$$

arranged in a selected order, where $\lambda_c$ is a wavelength corresponding to one or more wavelength channels of the AWG.

* * * * *